United States Patent
Zhang et al.

(10) Patent No.: US 12,444,119 B2
(45) Date of Patent: Oct. 14, 2025

(54) RASTERIZATION OF COMPUTE WORKLOADS

(71) Applicant: QUALCOMM Incorporated, San Diego, CA (US)

(72) Inventors: Yibin Zhang, San Diego, CA (US); Zilin Ying, San Diego, CA (US); Yun Du, San Diego, CA (US); Heng Qi, San Diego, CA (US); Jiexia Yu, Shanghai (CN); Yang Yu, San Diego, CA (US); Andrew Evan Gruber, Arlington, MA (US); Jian Liang, San Diego, CA (US); Tao Wang, Sunnyvale, CA (US); Alexei Vladimirovich Bourd, San Diego, CA (US); Gang Zhong, San Diego, CA (US); Minjie Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 18/035,507

(22) PCT Filed: Nov. 9, 2020

(86) PCT No.: PCT/CN2020/127436
§ 371 (c)(1),
(2) Date: May 4, 2023

(87) PCT Pub. No.: WO2022/095010
PCT Pub. Date: May 12, 2022

(65) Prior Publication Data
US 2023/0394738 A1    Dec. 7, 2023

(51) Int. Cl.
*G06T 15/00* (2011.01)

(52) U.S. Cl.
CPC .................... *G06T 15/005* (2013.01)

(58) Field of Classification Search
CPC ..................................... G06T 15/005
See application file for complete search history.

(56) References Cited

U.S. PATENT DOCUMENTS

| 2012/0183215 A1 | 7/2012 | Van Hook et al. |
| 2013/0016110 A1* | 1/2013 | Arvo ............ G06F 9/4881 |
| | | 345/522 |

(Continued)

FOREIGN PATENT DOCUMENTS

| CN | 103984720 A | 8/2014 |
| CN | 104572755 A | 4/2015 |
| CN | 106683036 A | 5/2017 |

OTHER PUBLICATIONS

Supplementary European Search Report—EP20960468—Search Authority—Munich—Jul. 30, 2024.

(Continued)

*Primary Examiner* — Kee M Tung
*Assistant Examiner* — Khoa Vu
(74) *Attorney, Agent, or Firm* — Procopio, Cory, Hargreaves & Savitch LLP

(57) ABSTRACT

The present disclosure relates to methods and apparatus for graphics processing, e.g., a GPU. The apparatus may receive an image including a plurality of pixels associated with one or more workgroups and one or more pixel tiles, each of the workgroups and the pixel tiles including one or more pixels of the plurality of pixels. The apparatus may determine whether the one or more workgroups are misaligned with the one or more pixel tiles. The apparatus may determine a conversion order of the one or more workgroups when the one or more workgroups are misaligned with the one or more pixel tiles, the conversion order corresponding to a common multiple of one of the one or more workgroups and (Continued)

one of the one or more pixel tiles. The apparatus may convert each of the one or more workgroups based on the conversion order of the one or more workgroups.

18 Claims, 10 Drawing Sheets

(56) References Cited

U.S. PATENT DOCUMENTS

| | | |
|---|---|---|
| 2014/0092087 A1 | 4/2014 | Kazama et al. |
| 2014/0198997 A1* | 7/2014 | Fukuhara ............ G06F 16/1847 |
| | | 382/305 |
| 2014/0210819 A1* | 7/2014 | Mei ....................... G06T 15/005 |
| | | 345/423 |
| 2017/0083999 A1* | 3/2017 | Saurabh .................... G06T 1/60 |
| 2017/0243395 A1 | 8/2017 | Vaidyanathan et al. |
| 2018/0165787 A1 | 6/2018 | Bolz |
| 2018/0285278 A1 | 10/2018 | Appu et al. |
| 2019/0005703 A1 | 1/2019 | Golas et al. |
| 2020/0041780 A1* | 2/2020 | Na'Aman .......... G02B 21/0072 |
| 2021/0134052 A1* | 5/2021 | DeLaurier ................. G06T 1/60 |
| 2022/0036632 A1* | 2/2022 | Krisch .................... G06F 9/544 |

OTHER PUBLICATIONS

International Search Report and Written Opinion—PCT/CN2020/127436—ISA/EPO—Jul. 26, 2021.

* cited by examiner

RASTERIZATION OF COMPUTE WORKLOADS

CROSS REFERENCE TO RELATED APPLICATION(S)

This application is a National Stage Application filed under 35 U.S.C. § 371 of PCT International Application No. PCT/CN2020/127436, entitled "METHODS AND APPARATUS FOR RASTERIZATION OF COMPUTE WORKLOADS" and filed Nov. 9, 2020, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU. Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus may receive an image including a plurality of pixels associated with one or more workgroups and one or more pixel tiles, each of the one or more workgroups including one or more pixels of the plurality of pixels and each of the one or more pixel tiles including one or more pixels of the plurality of pixels. The apparatus may also determine whether the one or more workgroups are misaligned with the one or more pixel tiles. The apparatus may also determine a conversion order of the one or more workgroups when the one or more workgroups are misaligned with the one or more pixel tiles, the conversion order corresponding to a common multiple of one of the one or more workgroups and one of the one or more pixel tiles. The apparatus may also convert each of the one or more workgroups based on the conversion order of the one or more workgroups. The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
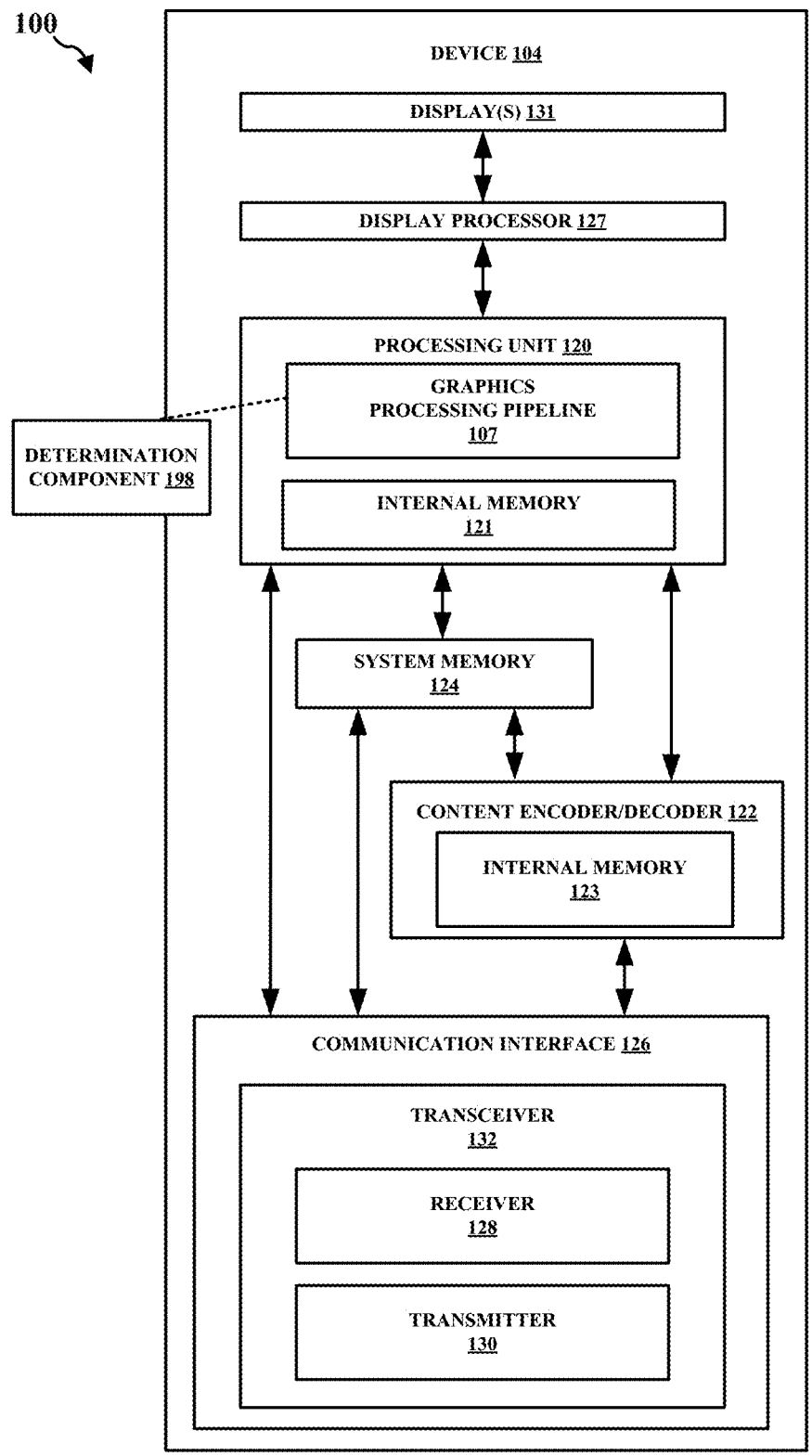
FIG. 1 is a block diagram that illustrates an example content generation system in accordance with one or more techniques of this disclosure.

In some aspects of graphics processing, due to the limited size of a level 2 (L2) cache, certain cachelines may be evicted to system memory. Such eviction of partially filled cachelines may be slow, as the L2 cache may need to read the original content from double data rate (DDR) RAM first, then perform compression, and then write the compressed data into DDR RAM. In some cases, the partially filled cacheline eviction may result in a large performance degradation. Such a large degradation may prevent drivers from enabling universal bandwidth compression (UBWC) compression for resources used by a compute shader. Such compression may help performance and power in normal cases, when a workgroup shape is aligned with a tile size of a long cacheline. As indicated above, one issue for enabling compression in a compute workload is the coalescing of requests from a shader processor (SP) to an L2 cache. Some compression algorithms may specify the resources to have a tiled layout instead of a linear layout, but certain patterns, e.g., a swizzling pattern, applied to the tiled resources may prevent adjacent work items in a compute workgroup from sending consecutive addresses to the L2 cache. These non-consecutive addresses may not be fully coalesced by SP engine, and may waste the SP to L2 cache bandwidth, and slow down the L2 cache by an excessive number of requests and bank conflicts caused by same-address accesses. There may be performance degradation caused by this coalescing issue as a linear resource layout is switched to compressed (tiled) resource layout in a compute workload. Aspects of the present disclosure may utilize compute workloads that reduce or mitigate partial eviction. For instance, aspects of the present disclosure may utilize tiled workgroup rasterization for reducing partial eviction. This tiled workgroup rasterization process is described herein. Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing.

In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content. The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to receive an image including a plurality of pixels associated with one or more workgroups and one or more pixel tiles, each of the one or more workgroups including one or more pixels of the plurality of pixels and each of the one or more pixel tiles including one or more pixels of the plurality of pixels. The determination component 198 can also be configured to determine whether the one or more workgroups are misaligned with the one or more pixel tiles. The determination component 198 can also be configured to determine a conversion order of the one or more workgroups when the one or more workgroups are misaligned with the one or more pixel tiles, the conversion order corresponding to a common multiple of one of the one or more workgroups and one of the one or more pixel tiles. The determination component 198 can also be configured to convert each of the one or more workgroups based on the conversion order of the one or more workgroups.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
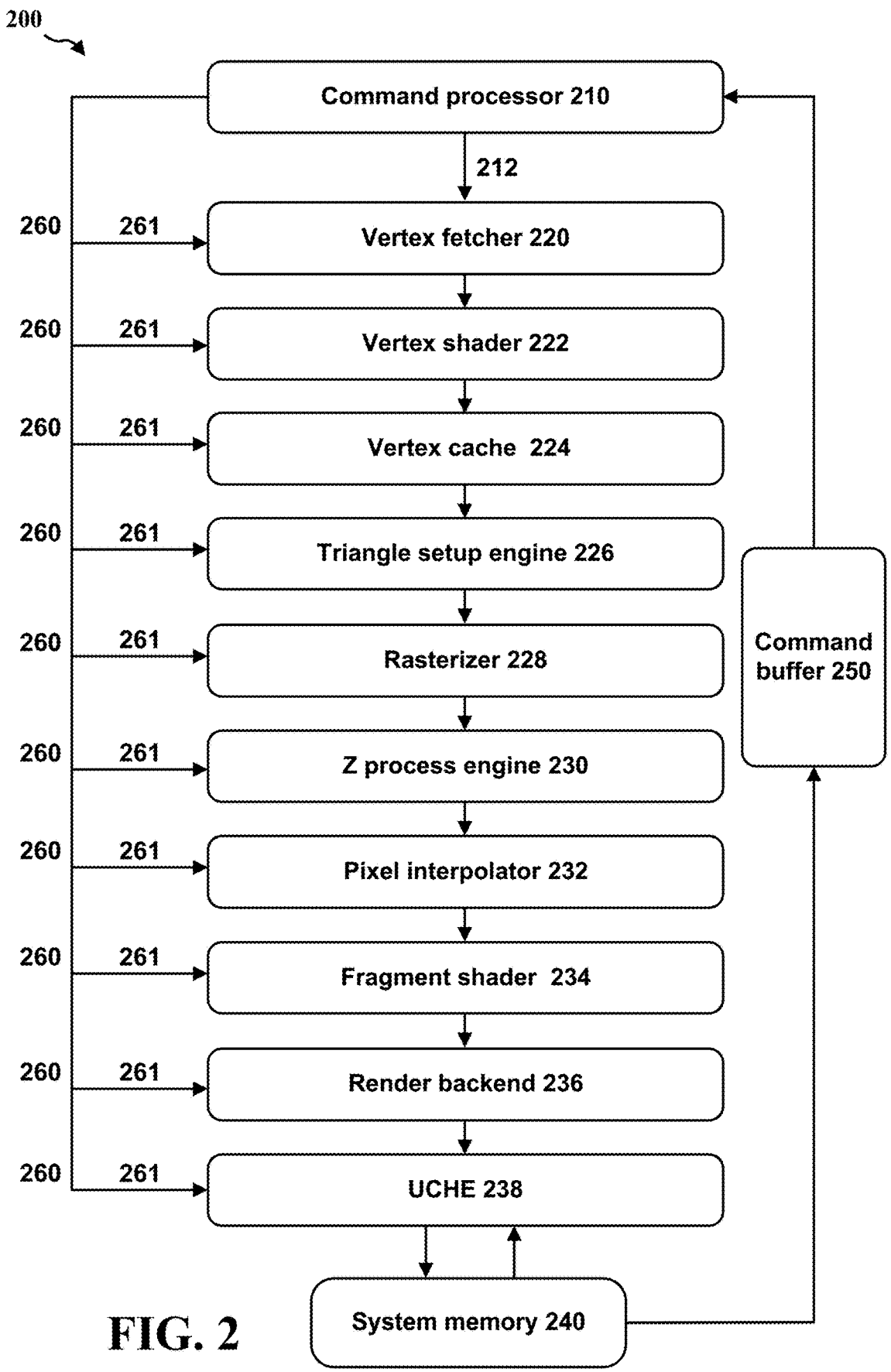
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin. Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
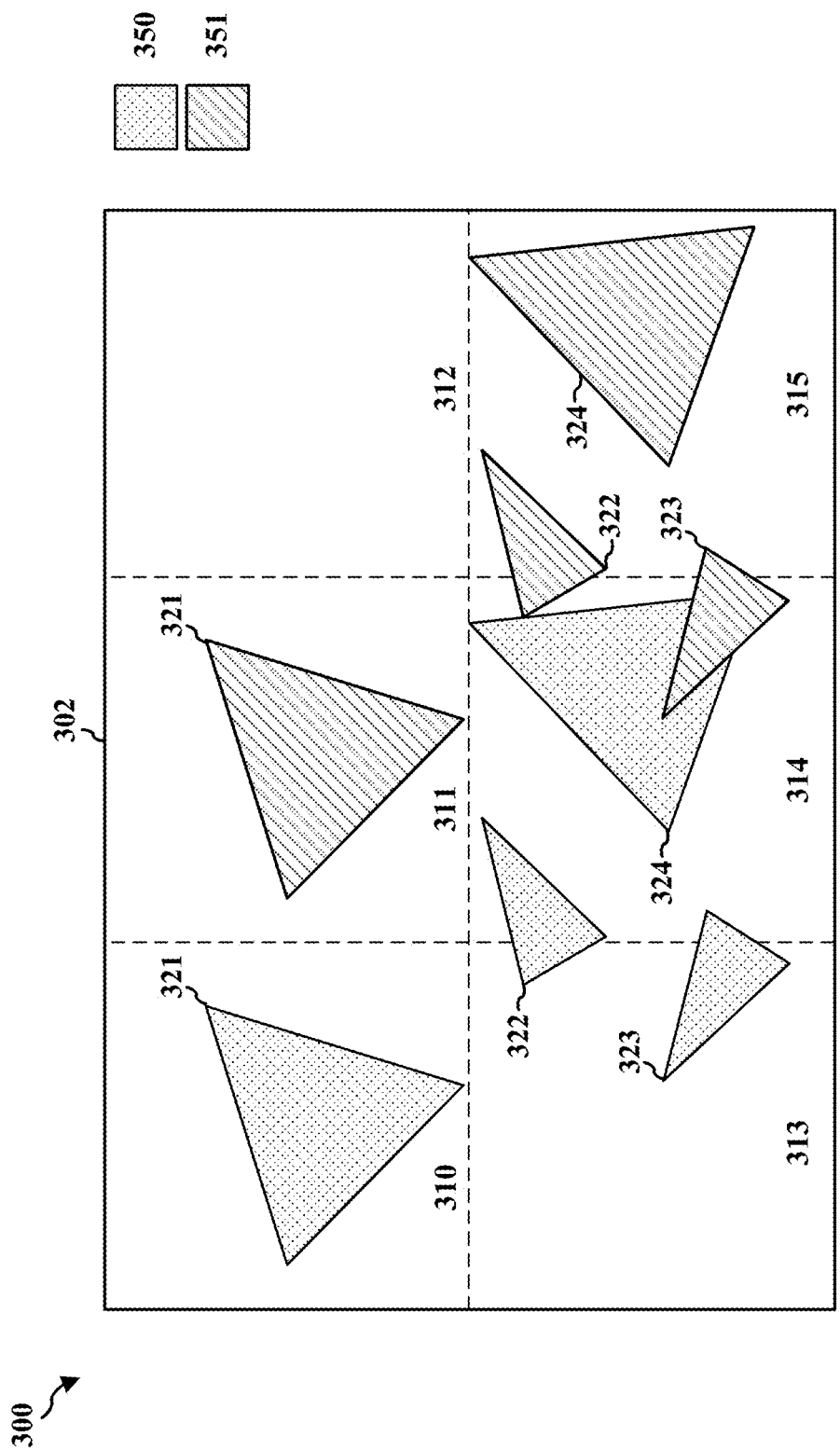
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In some aspects of graphics processing, compression can be enabled for certain compute workloads of GPUs. However, enabling compression for all compute workloads without performance degradation can be a challenge to GPU architecture. For instance, there may be a partial eviction of long cachelines in a level 2 (L2) cache and/or a bad request coalescing ratio when compression is enabled for compute workloads.

In some instances, when compression is enabled for GPU resources, the internal L2 cachelines may be configured to long cachelines. Such long cachelines may suffer from performance penalties when it is not fully written but has to be evicted out to system memory. For example, the L2 cache may need to fetch the original content from system memory, compress it, then write it back to system memory. This long serialized process may cause performance degradation to benchmarks. The reason for such partially written cachelines may be because some applications use a workgroup shape that is not aligned with the shape of the L2 long cacheline. So when a GPU rasterizes the workgroups linearly, it may not fill the long cacheline in a sufficient amount of time. In some cases, when an application uses a certain workgroup size, e.g., a 32×1 workgroup size, while the GPUs long cacheline is 8×4, ideally four (4) workgroups can be rasterized vertically, to a cover 32×4 area, and then rasterization may be performed horizontally. In these cases, the 32×4 area may be aligned to an 8×4 area, and may fill the long cacheline quickly.

Figure 4:
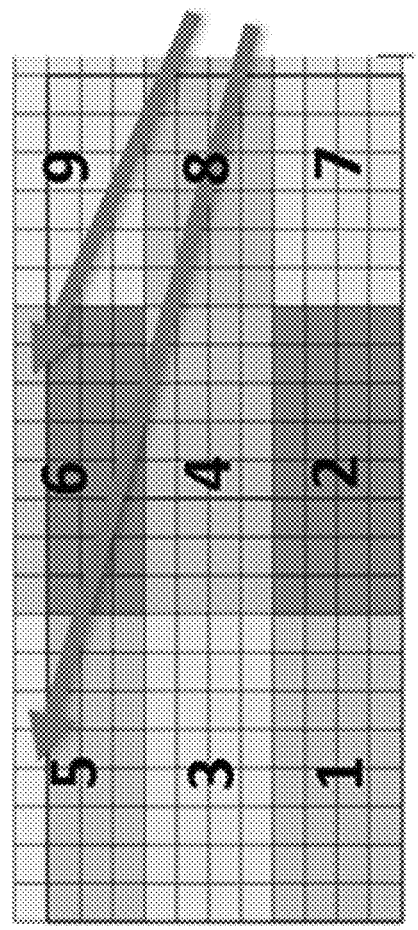
FIG. 4 illustrates an example diagram of a cache storage process in accordance with one or more techniques of this disclosure.

FIG. 4 illustrates a diagram 400 of a cache storage process. As shown in FIG. 4, when tiled compression is enabled for image resources, a GPU's L2 cachelines may be configured as long cachelines, which may cover a rectangle area, like the 8×4 tiles in FIG. 4. However, if an application using a compute shader chooses to use a workgroup shape that is not aligned with these 8×4 tiles, the long cacheline may not be fully written before the cacheline is evicted.

As shown in FIG. 4, the workgroup shape may be 11×11 pixels, e.g., as shown in the box outlines. The first workgroup can fully cover cachelines 1 and 3, and partially cover cachelines 2, 4, 5, and 6. The second workgroup may fill the remaining pixels of cachelines 2 and 4, but cachelines 5 and 6 may not be fully covered. Some workgroup rasterizations may be linear, e.g., for a 1920×1080 resolution compute workload, the 176th (1920/11) workgroup may cover cacheline 5, but it may not be sufficient. Due to the limited size of the L2 cache, cacheline 5 may be evicted to system memory. Such eviction of partially filled cachelines may be slow, as the L2 cache may need to read the original content from DDR first, then perform compression, and then write the compressed data into DDR.

In some cases, the partially filled cacheline eviction may result in a large performance degradation. For example, some benchmarks may use a 32×1 workgroup size, and if tiled compression is enabled for images, there may be a certain performance degradation, e.g., a 60% performance degradation. Such a large degradation may prevent drivers from enabling universal bandwidth compression (UBWC) compression for resources used by a compute shader. Such compression may help performance and power in normal cases, when a workgroup shape is aligned with a tile size of a long cacheline.

Figure 5:
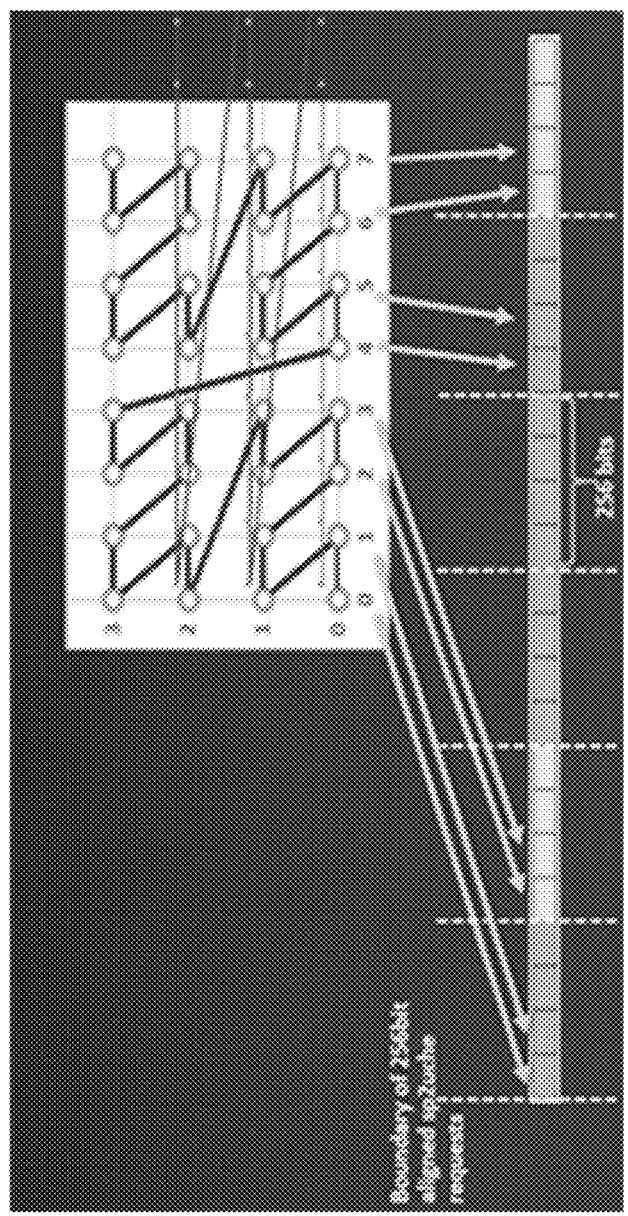
FIG. 5 illustrates an example diagram of a rasterization process in accordance with one or more techniques of this disclosure.

FIG. 5 illustrates a diagram 500 of a rasterization process. As indicated in FIG. 5, another issue for accessing compressed image resources is a bad L2 cache request coalescing. As shown in FIG. 5, for a compressed image, the mapping from pixel coordinates to an image address offset may be in a zigzag or swizzling order, such that the smallest granularity for such a swizzling pattern is 4×4. Such a swizzling pattern may mean that for a row of pixels, the offsets are not consecutive. If the work items are rasterized in a workgroup in a linear order, adjacent fibers may be accessing pixels with non-adjacent offsets, which may lead to bad coalescing. In FIG. 5, each fiber fetches 64-bits of data, and adjacent four (4) fibers may be sending two 256-bit requests to the L2 cache, and each request may have 128-bits of content, which is a waste of L2 input bandwidth.

As indicated above, one issue for enabling compression in a compute workload is the coalescing of requests from a shader processor (SP) to an L2 cache. Some compression algorithms may specify the resources to have a tiled layout instead of a linear layout, but certain patterns, e.g., a swizzling pattern, applied to the tiled resources may prevent adjacent work items in a compute workgroup from sending consecutive addresses to the L2 cache. These non-consecutive addresses cannot be fully coalesced by SP engine, and may waste the SP to L2 cache bandwidth, and slow down the L2 cache by an excessive number of requests and bank conflicts caused by same-address accesses. There may be performance degradation caused by this coalescing issue a linear resource layout is switched to compressed (tiled) resource layout in a compute workload. Based on the above, it may be beneficial to utilize compute workloads that reduce or mitigate partial eviction.

Aspects of the present disclosure may utilize compute workloads that reduce or mitigate partial eviction. For instance, aspects of the present disclosure may utilize tiled workgroup rasterization for reducing partial eviction. This tiled workgroup rasterization process is described herein.

Figure 6:
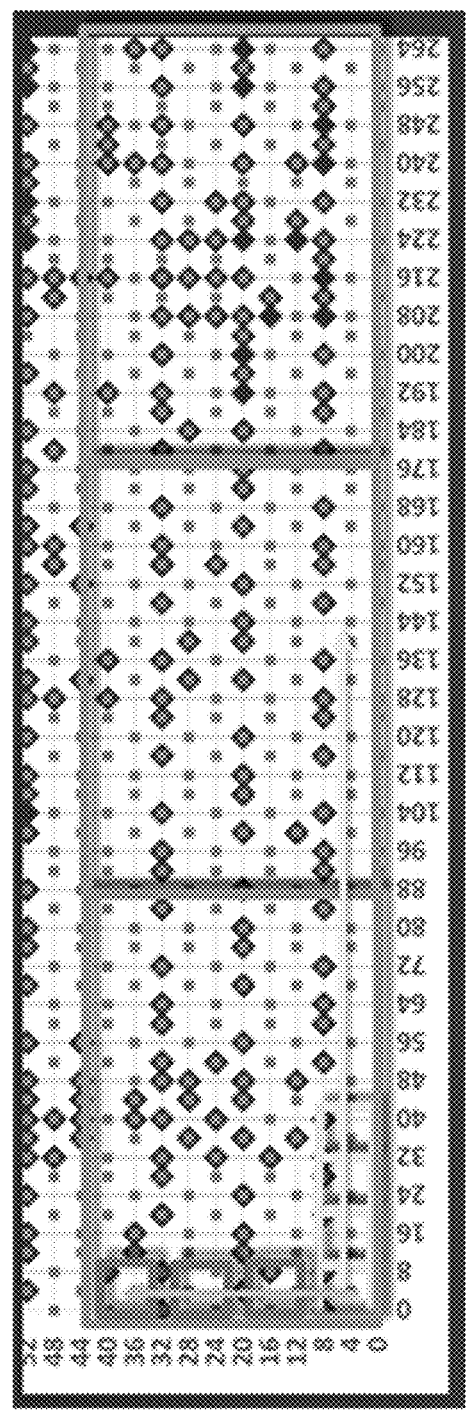
FIG. 6 illustrates an example diagram of a rasterization process in accordance with one or more techniques of this disclosure.

FIG. 6 illustrates a diagram 600 of a rasterization process in accordance with one or more techniques of this disclosure. As shown in FIG. 6, instead of rasterizing workgroups linearly (light gray arrow), aspects of the present disclosure may utilize HLSQ rasterizes workgroups within a tile of 8×4 workgroups (darker gray arrow inside the larger rectangle). The present disclosure may then dispatch these 8×4-sized tiles (light gray rectangles) linearly.

Aspects of the present disclosure propose a snake walking order for tiled workgroup rasterization, which solves the partial eviction problem of an L2 cacheline. For instance, aspects of the present disclosure may utilize a snake pattern or snake walking rasterization order. With the snake walking rasterization order, the present disclosure can fill 8×4 rectangles in time and avoid partial eviction. Aspects of the present disclosure also propose a tiled work item rasterization order, which can ensure adjacent fibers in a shader wave may be accessing consecutive addresses, and then fully utilize the coalescing engine in a shader engine and fully utilize the L2 cache.

Figure 7:
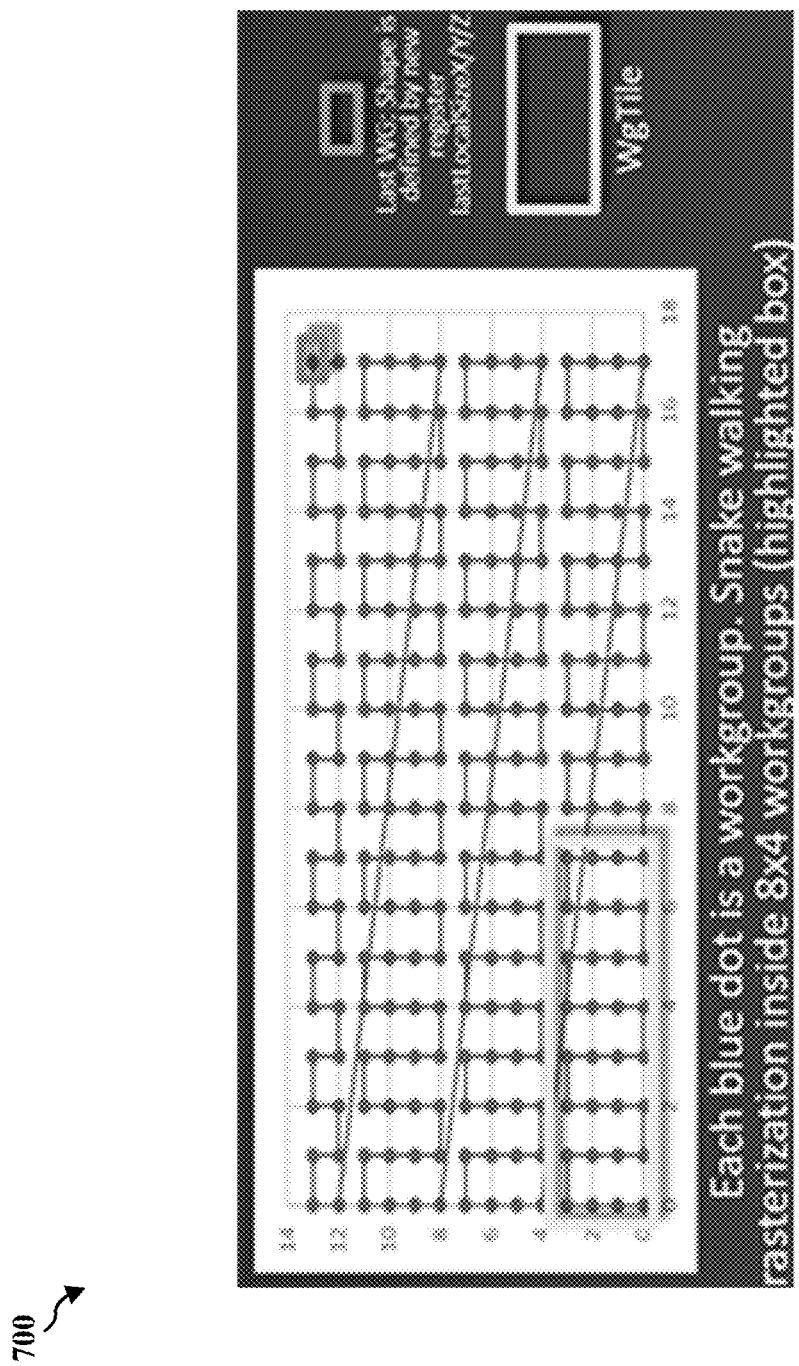
FIG. 7 illustrates an example diagram of a rasterization process in accordance with one or more techniques of this disclosure.

FIG. 7 illustrates a diagram 700 of a rasterization process in accordance with one or more techniques of this disclosure. As shown in FIG. 7, aspects of the present disclosure propose a snake walking rasterization inside a tile of workgroups. Each dot in FIG. 7 is a workgroup. A snake walking process is better at spatial locality and may reduce more partially written long cachelines.

Figure 8:
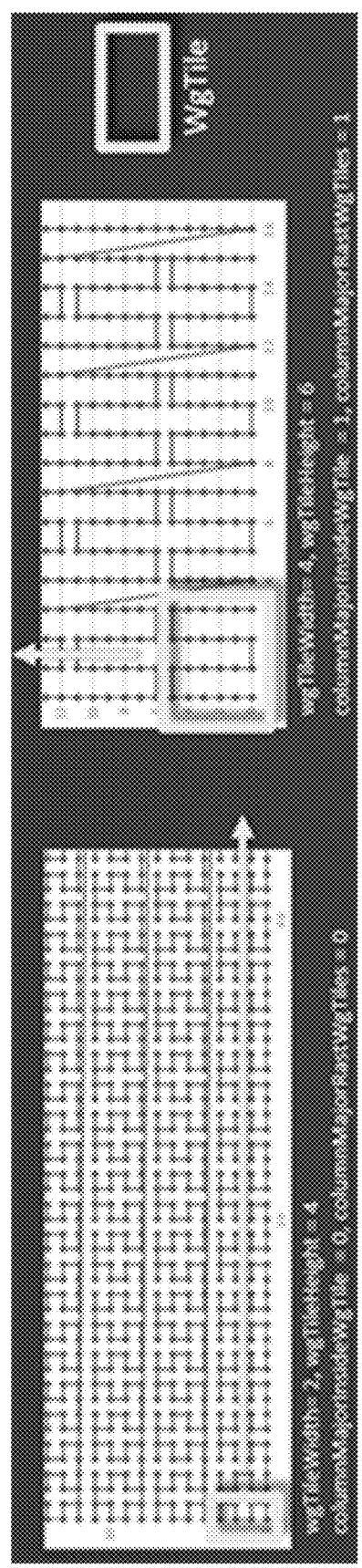
FIG. 8 illustrates an example diagram of a rasterization process in accordance with one or more techniques of this disclosure.

FIG. 8 illustrates a diagram 800 of a rasterization process in accordance with one or more techniques of this disclosure. FIG. 8 shows another aspect of snake walking rasterization inside a tile of workgroups of the present disclosure. The snake walking algorithm proposed herein allows column major or row major order inside 8×4 workgroups. The present disclosure also allows the rasterization of 8×4 workgroup tiles in column major or row major order. And the present disclosure allows arbitrary shapes of workgroup tiles, instead of just an 8×4 size. Drivers can also select what shape is more suitable for access patterns.

In some aspects, the present disclosure supports rasterizing certain directions first, e.g., a z direction first. For example, for a global size (2, 2, 2), local (1, 1, 1), if the z direction is rasterized first, the output coordinates may be (0, 0, 0), (0, 0, 1), (1, 0, 0), (1, 0, 1), (0, 1, 0), (0, 1, 1), (1, 1, 0), (1, 1, 1). When certain global IDs are utilized, e.g., a global id.z, as offset of texture's x coordinate, this rasterization order may fully fill long cachelines earlier when compression is enabled.

Figure 9:
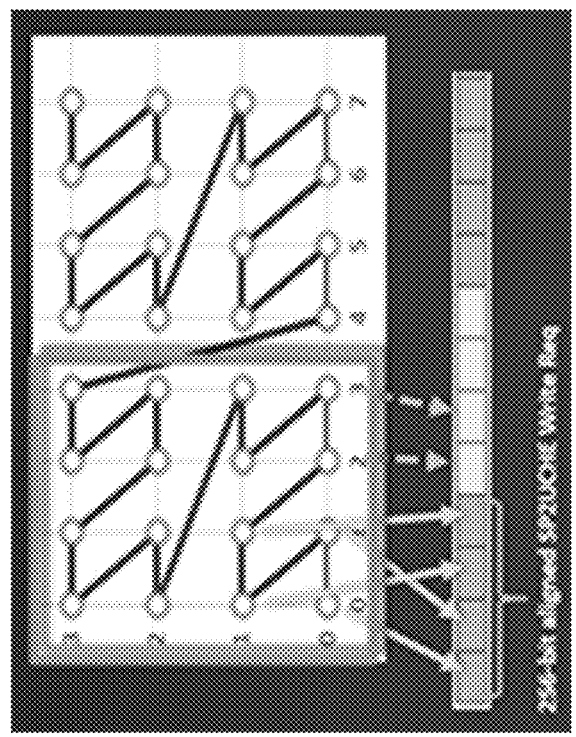
FIG. 9 illustrates an example diagram of a rasterization process in accordance with one or more techniques of this disclosure.

FIG. 9 illustrates a diagram 900 of a rasterization process in accordance with one or more techniques of this disclosure. As shown in FIG. 9, in order to solve the coalescing issue mentioned above, the present disclosure proposes tiled work item rasterization. As shown in FIG. 9, the tiled work item rasterizations may include a 4×4 zigzag pattern. Instead of rasterizing work items linearly, shader processors may rasterize work items within a tile of 4×4 work items, then dispatch these 4×4-sized tiles linearly. A 4×4 zigzag pattern is also friendly to certain types of coalescing, e.g., 8-fiber or 16-fiber coalescing. In some aspects, the driver may need to do dynamic decision making for when tiled workgroup or tiled work item rasterization is enabled. If any resource bound to a compute shader is compressed, the present disclosure may enable the resource in order to reduce partial eviction of long L2 cachelines, and to achieve better L2 request coalescing.

In some instances, aspects of the present disclosure may result in a performance uplift, e.g., a 4.1% performance uplift, on benchmarks with experimental designs. Aspects of the present disclosure may also make certain applications run faster. The features of aspects of the present disclosure may have no performance degradation to other key benchmarks.

By applying these aforementioned architecture fixes, GPU drivers can enable compression for compute workloads. For example, there may be no performance degradation on benchmarks after using tiled workgroup and work item rasterization, so drivers can enable UBWC compression for all resources in compute workloads. By enabling compression in compute workloads, aspects of the present disclosure may result in a certain performance uplift, e.g., 12.4% performance uplift plus 30% DDR traffic reduction for certain implementations. The present disclosure can also achieve a 53.4% performance uplift plus 42% DDR traffic reduction for some implementations, and a 5.4% performance uplift plus 25% DDR traffic reduction for other implementations. The reduction of DDR traffic may greatly reduce power consumption. Also, by enabling tiled work item rasterization on certain benchmarks, a certain amount of requests, e.g., 32% of requests, from shader engines to an L2 cache may be reduced.

Figure 10:
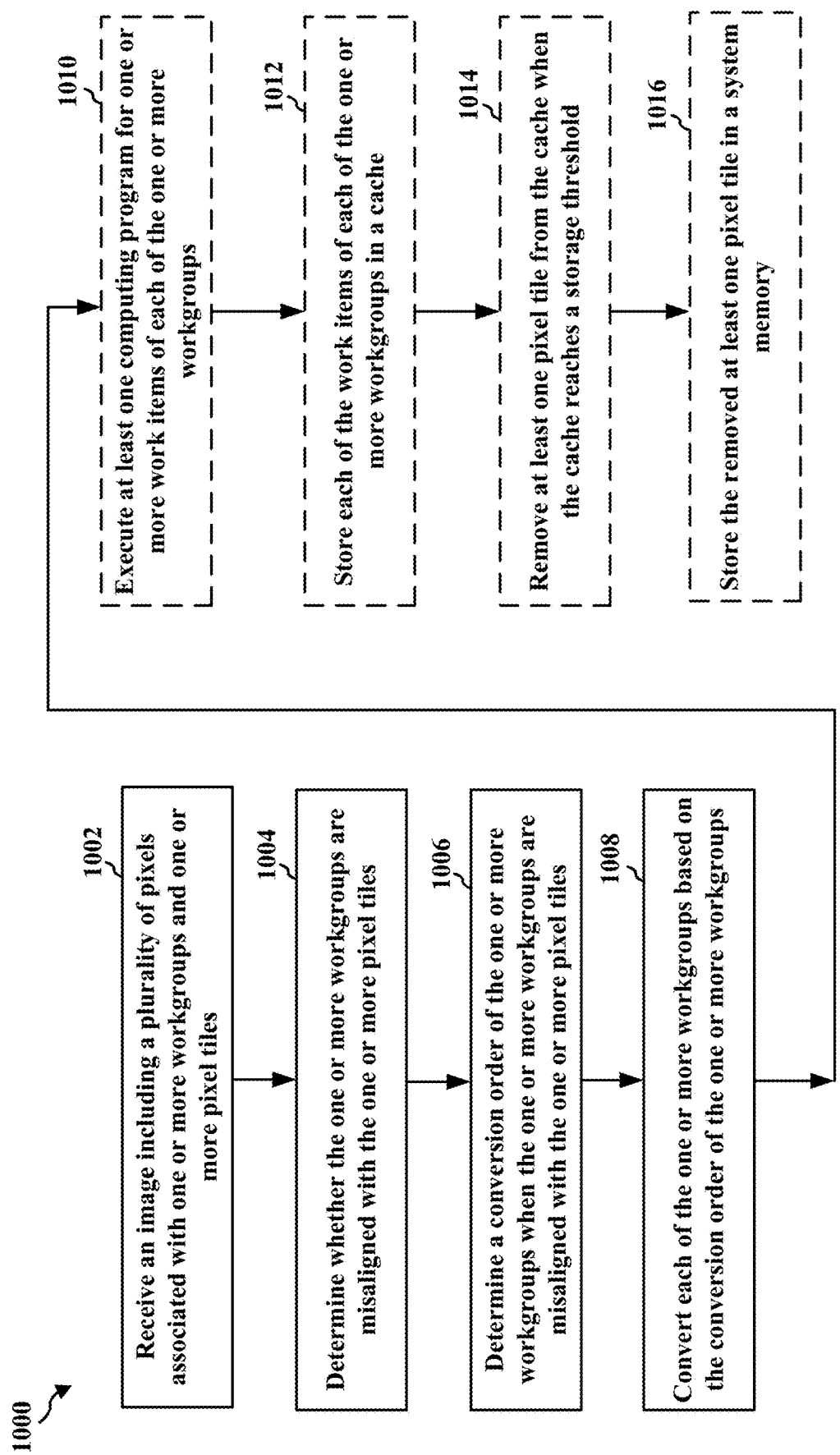
FIG. 10 illustrates an example flowchart of an example method in accordance with one or more techniques of this disclosure.

FIG. 10 illustrates a flowchart 1000 of an example method in accordance with one or more techniques of this disclosure. The method may be performed by an apparatus such as a GPU, a GPU driver, a CPU, or an apparatus for graphics processing.

At 1002, the apparatus may receive an image including a plurality of pixels associated with one or more workgroups and one or more pixel tiles, each of the one or more workgroups including one or more pixels of the plurality of pixels and each of the one or more pixel tiles including one or more pixels of the plurality of pixels, as described in connection with the examples in FIGS. 4-9. In some aspects, the one or more pixel tiles may be determined based on a compression granularity of the plurality of pixels, as described in connection with the examples in FIGS. 4-9.

At 1004, the apparatus may determine whether the one or more workgroups are misaligned with the one or more pixel tiles, as described in connection with the examples in FIGS. 4-9.

At 1006, the apparatus may determine a conversion order of the one or more workgroups when the one or more workgroups are misaligned with the one or more pixel tiles, the conversion order corresponding to a common multiple of one of the one or more workgroups and one of the one or more pixel tiles, as described in connection with the examples in FIGS. 4-9. In some aspects, the conversion order may correspond to a snake pattern of the one or more workgroups and the one or more pixel tiles, as described in connection with the examples in FIGS. 4-9. Additionally, the conversion order may be determined by a rasterization algorithm, the conversion order corresponding to a rasterization order, as described in connection with the examples in FIGS. 4-9.

At 1008, the apparatus may convert each of the one or more workgroups based on the conversion order of the one or more workgroups, as described in connection with the examples in FIGS. 4-9. In some instances, converting each of the one or more workgroups based on the conversion order may comprise rasterizing each of the one or more workgroups based on the conversion order, as described in connection with the examples in FIGS. 4-9. Each of the one or more pixels in each of the one or more workgroups may be converted based on a workgroup conversion order, as described in connection with the examples in FIGS. 4-9. Also, the workgroup conversion order may correspond to a zigzag pattern of the one or more pixels in each of the one or more workgroups, as described in connection with the examples in FIGS. 4-9. At 1010, the apparatus may execute at least one computing program for one or more work items of each of the one or more workgroups, each of the one or more work items including one or more pixels, where the at least one computing program is executed based on the conversion order, as described in connection with the examples in FIGS. 4-9. The at least one computing program may be executed by a shader processor of a graphic processing unit (GPU), as described in connection with the examples in FIGS. 4-9.

At 1012, the apparatus may store each of the work items of each of the one or more workgroups in a cache, as described in connection with the examples in FIGS. 4-9. In some instances, the cache may be a level two (L2) cache, as described in connection with the examples in FIGS. 4-9.

At 1014, the apparatus may remove at least one pixel tile from the cache when the cache reaches a storage threshold, as described in connection with the examples in FIGS. 4-9.

At 1016, the apparatus may store the removed at least one pixel tile in a system memory, as described in connection with the examples in FIGS. 4-9.

In one configuration, a method or apparatus for graphics processing is provided. The apparatus may be a GPU, a GPU driver, a CPU, or some other processor that can perform graphics processing. In one aspect, the apparatus may be the processing unit 120 within the device 104, or may be some other hardware within device 104 or another device. The apparatus may include means for receiving an image including a plurality of pixels associated with one or more workgroups and one or more pixel tiles, each of the one or more workgroups including one or more pixels of the plurality of pixels and each of the one or more pixel tiles including one or more pixels of the plurality of pixels. The apparatus may also include means for determining whether the one or more workgroups are misaligned with the one or more pixel tiles. The apparatus may also include means for determining a conversion order of the one or more workgroups when the one or more workgroups are misaligned with the one or more pixel tiles, the conversion order corresponding to a common multiple of one of the one or more workgroups and one of the one or more pixel tiles. The apparatus may also include means for converting each of the one or more workgroups based on the conversion order of the one or more workgroups. The apparatus may also include means for executing at least one computing program for one or more work items of each of the one or more workgroups, each of the one or more work items including one or more pixels, where the at least one computing program is executed based on the conversion order. The apparatus may also include means for storing each of the work items of each of the one or more workgroups in a cache. The apparatus may also include means for removing at least one pixel tile from the cache when the cache reaches a storage threshold. The apparatus may also include means for storing the removed at least one pixel tile in a system memory.

The subject matter described herein can be implemented to realize one or more benefits or advantages. For instance, the described graphics processing techniques can be used by a GPU, a GPU driver, a CPU, or some other processor that can perform graphics processing to implement the rasterization techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize rasterization techniques in order to improve cache conditions and/or reduce performance overhead.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

The following aspects are illustrative only and may be combined with other aspects or teachings described herein, without limitation.

Aspect 1 is a method of graphics processing. The method includes receiving an image including a plurality of pixels associated with one or more workgroups and one or more pixel tiles, each of the one or more workgroups including one or more pixels of the plurality of pixels and each of the one or more pixel tiles including one or more pixels of the plurality of pixels; determining whether the one or more workgroups are misaligned with the one or more pixel tiles; determining a conversion order of the one or more workgroups when the one or more workgroups are misaligned with the one or more pixel tiles, the conversion order corresponding to a common multiple of one of the one or more workgroups and one of the one or more pixel tiles; and converting each of the one or more workgroups based on the conversion order of the one or more workgroups.

Aspect 2 is the method of aspect 1, where the conversion order corresponds to a snake pattern of the one or more workgroups and the one or more pixel tiles.

Aspect 3 is the method of any of aspects 1 and 2, where each of the one or more pixels in each of the one or more workgroups are converted based on a workgroup conversion order.

Aspect 4 is the method of any of aspects 1 to 3, where the workgroup conversion order corresponds to a zigzag pattern of the one or more pixels in each of the one or more workgroups.

Aspect 5 is the method of any of aspects 1 to 4, further comprising executing at least one computing program for one or more work items of each of the one or more workgroups, each of the one or more work items including one or more pixels, where the at least one computing program is executed based on the conversion order.

Aspect 6 is the method of any of aspects 1 to 5, where the at least one computing program is executed by a shader processor of a graphic processing unit (GPU).

Aspect 7 is the method of any of aspects 1 to 6, further comprising storing each of the work items of each of the one or more workgroups in a cache.

Aspect 8 is the method of any of aspects 1 to 7, further comprising removing at least one pixel tile from the cache when the cache reaches a storage threshold; and storing the removed at least one pixel tile in a system memory.

Aspect 9 is the method of any of aspects 1 to 8, where the cache is a level two (L2) cache.

Aspect 10 is the method of any of aspects 1 to 9, where the one or more pixel tiles are determined based on a compression granularity of the plurality of pixels.

Aspect 11 is the method of any of aspects 1 to 10, where the conversion order is determined by a rasterization algorithm, the conversion order corresponding to a rasterization order.

Aspect 12 is the method of any of aspects 1 to 11, where converting each of the one or more workgroups based on the conversion order comprises rasterizing each of the one or more workgroups based on the conversion order.

Aspect 13 is an apparatus for graphics processing including means for implementing a method as in any of aspects 1 to 12.

Aspect 14 is an apparatus for graphics processing including at least one processor coupled to a memory and configured to implement a method as in any of aspects 1 to 12.

Aspect 15 is a computer-readable medium storing computer executable code, where the code when executed by a processor causes the processor to implement a method as in any of aspects 1 to 12.

What is claimed is:

1. A method of graphics processing, comprising:
   receiving an image including a plurality of pixels associated with one or more workgroups and one or more pixel tiles, each of the one or more workgroups including one or more pixels of the plurality of pixels and each of the one or more pixel tiles including one or more pixels of the plurality of pixels;
   determining whether the one or more workgroups are misaligned with the one or more pixel tiles;
   determining, based on a rasterization algorithm, a conversion order of the one or more workgroups when the one or more workgroups are misaligned with the one or more pixel tiles, the conversion order corresponding to a common multiple of one of the one or more workgroups and one of the one or more pixel tiles, wherein the conversion order corresponds to a rasterization order associated with adjacent fibers that access consecutive addresses; and
   converting each of the one or more workgroups based on the conversion order of the one or more workgroups.

2. The method of claim 1, wherein the conversion order corresponds to a snake pattern of the one or more workgroups and the one or more pixel tiles.

3. The method of claim 1, wherein each of the one or more pixels in each of the one or more workgroups are converted based on a workgroup conversion order.

4. The method of claim 3, wherein the workgroup conversion order corresponds to a zigzag pattern of the one or more pixels in each of the one or more workgroups.

5. The method of claim 1, further comprising:
   executing at least one computing program for one or more work items of each of the one or more workgroups, each of the one or more work items including one or more pixels, wherein the at least one computing program is executed based on the conversion order.

6. The method of claim 1, wherein converting each of the one or more workgroups based on the conversion order comprises rasterizing each of the one or more workgroups based on the conversion order.

7. An apparatus for graphics processing, comprising:
   memory; and
   at least one processor coupled to the memory and configured to:
   receive an image including a plurality of pixels associated with one or more workgroups and one or more pixel tiles, each of the one or more workgroups including one or more pixels of the plurality of pixels and each of the one or more pixel tiles including one or more pixels of the plurality of pixels;
   determine whether the one or more workgroups are misaligned with the one or more pixel tiles;
   determine, based on a rasterization algorithm, a conversion order of the one or more workgroups when the one or more workgroups are misaligned with the one or more pixel tiles, the conversion order corresponding to a common multiple of one of the one or more workgroups and one of the one or more pixel tiles, wherein the conversion order corresponds to a rasterization order associated with adjacent fibers that access consecutive addresses; and convert each of the one or more workgroups based on the conversion order of the one or more workgroups.

8. The apparatus of claim 7, wherein the conversion order corresponds to a snake pattern of the one or more workgroups and the one or more pixel tiles.

9. The apparatus of claim 7, wherein to convert each of the one or more workgroups, the at least one processor is configured to convert each of the one or more pixels in each of the one or more workgroups based on a workgroup conversion order.

10. The apparatus of claim 9, wherein the workgroup conversion order corresponds to a zigzag pattern of the one or more pixels in each of the one or more workgroups.

11. The apparatus of claim 7, wherein the at least one processor is configured to:

execute, based on the conversion order, at least one computing program for one or more work items of each of the one or more workgroups, each of the one or more work items including one or more pixels.

12. The apparatus of claim 11, wherein to execute the at least one computing program, the at least one processor is configured to execute the at least one computing program with a shader processor of a graphic processing unit (GPU).

13. The apparatus of claim 11, wherein the at least one processor is configured to:

store each of the work items of each of the one or more workgroups in a cache.

14. The apparatus of claim 13, wherein the at least one processor is configured to:

remove at least one pixel tile from the cache when the cache reaches a storage threshold; and store the removed at least one pixel tile in a system memory.

15. The apparatus of claim 13, wherein the cache is a level two (L2) cache.

16. The apparatus of claim 7, wherein the one or more pixel tiles are based on a compression granularity of the plurality of pixels.

17. The apparatus of claim 7, wherein to convert each of the one or more workgroups based on the conversion order, the at least one processor is configured to rasterize each of the one or more workgroups based on the conversion order.

18. A non-transitory computer-readable medium storing computer executable code for graphics processing, the code when executed by a processor causes the processor to:

receive an image including a plurality of pixels associated with one or more workgroups and one or more pixel tiles, each of the one or more workgroups including one or more pixels of the plurality of pixels and each of the one or more pixel tiles including one or more pixels of the plurality of pixels;

determine whether the one or more workgroups are misaligned with the one or more pixel tiles;

determine, based on a rasterization algorithm, a conversion order of the one or more workgroups when the one or more workgroups are misaligned with the one or more pixel tiles, the conversion order corresponding to a common multiple of one of the one or more workgroups and one of the one or more pixel tiles, wherein the conversion order corresponds to a rasterization order associated with adjacent fibers that access consecutive addresses; and convert each of the one or more workgroups based on the conversion order of the one or more workgroups.

* * * * *